Patented July 8, 1924.

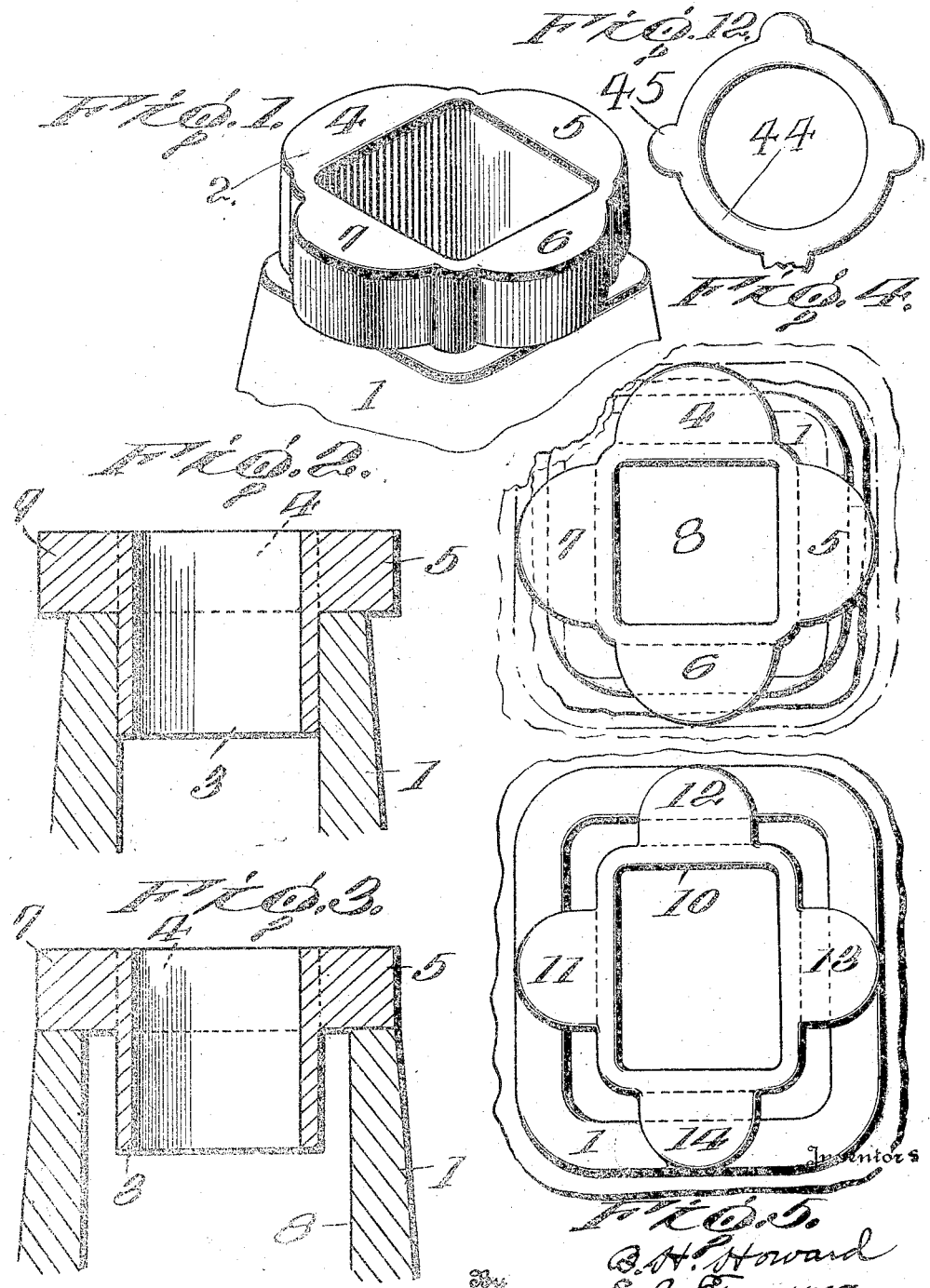

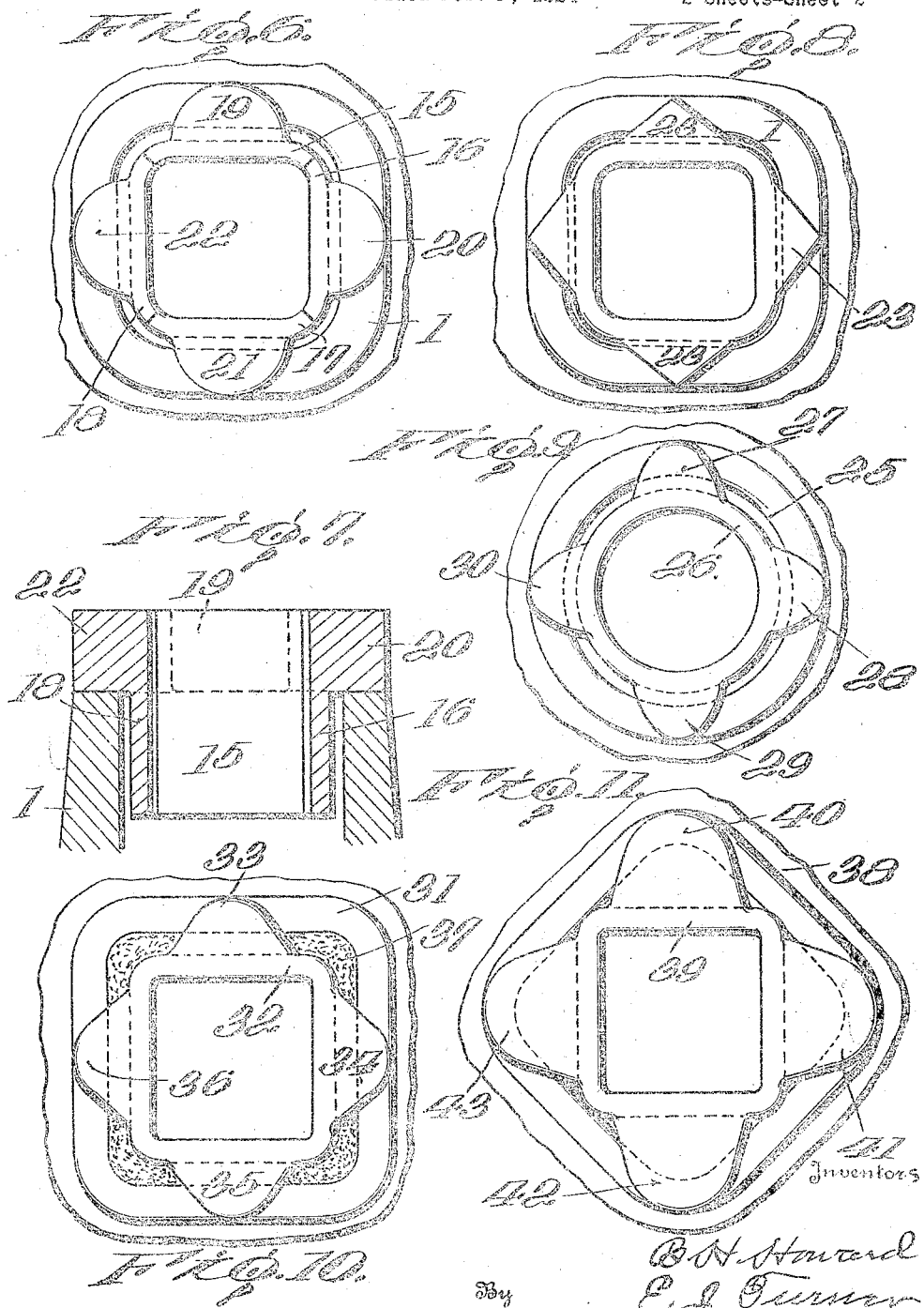

1,500,742

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed February 9, 1924. Serial No. 691,735.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in hot top feeders for ingot molds.

The object of our invention is to provide a feeder for ingot molds adapted to be readily inserted and supported on the upper end of the mold and at the same time provide a feeder which will prevent the formation of what is known as " piping " and at the same time reduce segregation.

Another object of our invention is to provide a hot top feeder for ingot molds having means on its outer periphery adapted to support the feeder in molds of different sizes and said means also serving as a strengthening means for that portion of the feeder above the mold.

A further object of our invention is to provide a feeder of this character in which the minimum amount of material is used and yet at the same time retain the necessary strength at that portion of the mold subjected to the greatest strain and also provide a simple, cheap and effective feeder having certain details of structure and combination of parts hereinafter more fully set forth.

In the accompanying drawings:—

Figure 1 is a perspective view of a mold showing a feeder therein embodying our invention.

Figure 2 is a vertical transverse sectional view of Figure 1.

Figure 3 is a vertical transverse sectional view similar to Figure 2 showing the feeder applied to a mold of a greater diameter than that shown in Figure 2.

Figure 4 is a top plan view showing in full lines one size mold and in dotted lines another.

Figure 5 is a top plan view of a rectangular mold and feeder embodying a modified form of our invention.

Figure 6 is a top plan view of a sectional feeder embodying the general form shown in Figures 1, 2 and 3.

Figure 7 is a vertical transverse sectional view of Figure 6.

Figure 8 is a top plan view of a still further modified form of our improved feeder.

Figure 9 is a top plan view of a circular mold and feeder showing supporting and strengthening means.

Figure 10 is a top plan view of a rectangular mold and feeder showing the mold of a considerably greater diameter than that of the feeder and showing the space around the feeder packed with fire clay.

Figure 11 is a top plan view showing a feeder embodying our invention applied to a mold the diameter of which is considerably greater than that of the feeder and the supporting and strengthening means arranged to cover the space between the bore of the mold and the outer periphery of the feeder.

Figure 12 is a top plan view showing a circular form of hot top feeder.

Referring now to the drawings 1 represents the ingot mold and 2 the feeder. The feeder 2 as shown, comprises the portion 3 which is of a shape to conform with the bore of the mold and adapted to enter the same. The upper end of the portion 2 as shown on all four sides is provided with outwardly extending enlarged ribs 4, 5, 6 and 7 which extend a considerable distance beyond the outer periphery of the portion 3 of the mold and are adapted to rest upon the upper end of the mold and support the feeder with the portion 3 within the upper end of the mold. The ribs 4, 5 and 6 are each of a width to extend approximately across one side wall of the feeder and whereby the feeder is supported upon the upper end of the mold against any rocking movement. The said ribs greatly strengthen that portion of the feeder above the mold and prevent the breaking of the same. This arrangement of the ribs also greatly reduces the amount of material used in the manufacture of the feeder and yet retains the strength of that portion subjected to the greatest strain.

In Figure 3 of the drawings, the form of feeder shown in Figures 1 and 2 is applied to a mold, the bore 8 of which is considerably greater than the outer periphery of the portion 3 of the feeder and yet the feeder is firmly supported on the upper end of the mold.

In Figure 4 the bore 8 of the larger mold is shown in dotted lines to indicate how the feeder is supported upon the two sizes of molds shown in Figures 2 and 3.

In Figure 5 we have shown a rectangular mold and feeder the mold 10 having the ribs 11, 12, 13 and 14 carried by the four sides and extending outwardly from the side walls of the feeder.

In Figures 6 and 7, the feeder is composed of four sections 15, 16, 17 and 18 extending into the bore of the mold, and each section provided at its upper end with ribs 19, 20, 21 and 22 which are of a width slightly less than the side wall of the section and whereby each section is independently and firmly supported in the mold. This construction enables each section to be supported on the mold and after the four sections are in position on the mold they cannot be collapsed.

In Figure 8 we have shown a rectangular mold and a rectangular feeder the side walls of which are provided with triangular ribs 23.

In Figure 9 the mold 25 is of a circular form and the feeder 26 of a similar form and provided with four ribs 27, 28, 29 and 30 arranged at equal distances apart and adapted to rest upon the upper end of the mold, the feeder being supported upon the upper end of the mold, and allows the same to be used on molds the bores of which are of a different diameter.

In Figure 10 we have shown the mold 31 and the feeder 32 of different diameters and the feeder supported by the ribs 33, 34, 35 and 36, the space between the bore of the mold and the outer wall of the feeder packed with fire clay as indicated at 37.

In Figure 11 we have shown the mold 38 of a size very much larger than the feeder 39 in which event the ribs 40, 41, 42 and 43 are arranged above the four corners of the mold 38 so as to close the upper end of the space between the bore of the mold and the outer wall of the feeder.

In Figure 12 we have shown a circular feeder 44, having four supporting ribs 45 on the outer face.

Having thus fully described our invention what we claim is:—

1. A feeder for ingot molds comprising a body portion adapted to enter the mold, supporting and strengthening means, extending a considerable distance beyond the body of the feeder.

2. A feeder for ingot molds comprising a body portion adapted to enter the mold and leaving a considerable space between the same and the wall of the mold, supporting and strengthening means extending over said space and resting upon the top of the mold.

3. A feeder for ingot molds comprising a body portion adapted to enter the mold and leaving a clear space between the feeder and the mold and extending entirely around the feeder and supporting means resting upon the upper end of the mold.

4. A feeder for ingot molds comprising a body portion adapted to enter the mold and each side wall having an outwardly extending, supporting and strengthening rib extending across the greater portion of the side wall.

5. A feeder for ingot molds comprising a body portion adapted to enter the mold, each side wall having a broad rib extending across the greater portion of the side wall and extending a considerable distance beyond the same, whereby the feeder is adapted to be supported in molds of different diameters.

6. A feeder for ingot molds comprising a body portion having each of its side walls provided with a broad outwardly curved rib extending across the greater portion of the side wall.

7. A feeder for ingot molds comprising a body portion formed of four vertical sections each section having an outwardly extending rib, extending across the greater portion of the section.

8. A feeder for ingot molds comprising a body portion, adapted to enter the mold and each side wall thereof having a broad outwardly supporting and strengthening means whereby the feeder may be turned in the mold, said supporting means being adapted to cover the bore of the mold.

In testimony whereof we affix our signatures.

BLOOMFIELD H. HOWARD.
ERNEST J. TURNER.